US005574614A

United States Patent [19]

Busse et al.

[11] Patent Number: 5,574,614

[45] Date of Patent: Nov. 12, 1996

[54] PROTECTION PLUG

[75] Inventors: Ralf-Dieter Busse; Harlad Klein; Johann Oltmanns; Gerd Richter, all of Berlin, Germany

[73] Assignee: Krone Aktiengesellschaft, Berlin-Zehlendorf, Germany

[21] Appl. No.: 516,309

[22] Filed: Aug. 17, 1995

[30] Foreign Application Priority Data

Oct. 1, 1994 [DE] Germany .......................... 44 37 122.5

[51] Int. Cl.[6] .......................................... H02H 9/06

[52] U.S. Cl. ............................ 361/119; 361/58; 361/127; 337/148; 337/206

[58] Field of Search .................................... 361/119, 127, 361/128, 98; 337/31, 148, 206; 340/638, 644, 660

[56] References Cited

U.S. PATENT DOCUMENTS 5,299,088 3/1994 Honl et al. .............................. 361/119

FOREIGN PATENT DOCUMENTS 4026004 8/1990 Germany .......................... H01T 4/08

*Primary Examiner*—Todd E. Deboer
*Attorney, Agent, or Firm*—McGlew and Tuttle, P.C.

[57] ABSTRACT

An over-voltage protection plug for telecommunication installations, including a housing with a printed-circuit board, a voltagesurge suppressor, a slider, a spring, an earth plate, a signalling element. Reliable protection against voltage surges is provided, wherein the solder position is loaded to a minimum extent only. The plug is composed of few parts only and further permits automated manufacture at low cost, and which clearly shows the tripped condition at the outside. The slider is pre-loaded over a support face and over an edge at the inner housing wall in the housing by the spring. A shaped part of solder material is loaded to a minimum extent only by the spring force (pressure force) of the slider.

5 Claims, 5 Drawing Sheets

PROTECTION PLUG

FIELD OF THE INVENTION

The present invention relates to a protection plug, in particular a voltage-surge protection plug for telecommunication installations, including a housing with a printed circuit board, a voltage-surge suppressor, a slider, a spring, an earth plate and a signalling element.

BACKGROUND OF THE INVENTION

A protection plug of the type referred to hereinbefore is described in DE 40 26 004 C2. This plug is adapted as a stage protection with a measuring and disconnecting position. The protection plug comprises a housing, the lower side of which is formed by a printed-circuit board, a voltage-surge suppressor, a slider, a spring, an earth plate, a signalling lug, a solder position melting with an inadmissible heating-up of the voltage-surge suppressor and causing a movement of the slider, which in turn will move the signalling lug outwardly for indication.

Disadvantageous, in this prior art protection plug, are the large number of individual parts used, thus an economical manufacture being difficult, and the load on the solder position exerted by the helical spring being tensioned, which may cause flow of the solder material.

SUMMARY AND OBJECTS OF THE INVENTION

It is an object of the invention to develop a protection plug for the reliable protection against voltage surges, wherein the solder position is loaded to a minimum extent only and which is composed of few parts only and further permits automated manufacture at low cost, and which clearly shows the tripped condition at the outside.

According to the invention, a protection plug is provided, in particular an over-voltage protection plug for telecommunication installations. The protection plug includes a housing with a printed circuit board, a voltage-surge suppressor, a slider, a spring, a ground (earth) plate and a signalling element. The slider is preloaded, over a support face and over an edge at an inner housing wall in the housing, by the spring. A shaped part of solder material is loaded to a minimum extent by the spring force of the slider.

The protection plug provided according to the invention meets, with only a few components, the following requirements:

—coarse protection;

—fail-safe with optical signalling;

—current protection; and

—measuring position.

Coarse protection is achieved in a known manner by a voltage-surge suppressor. The fail-safe mechanism connected to the voltage-surge suppressor provides a thermal protection in case of overloading of the voltage-surge suppressor, by shorting the telephone wires a, b to earth. This short-circuit mechanism is achieved by a slider, and a red signalling element at the rear side thereof being clearly visibly is moved outwards of the plug, when a voltage surge occurs.

Tripping of the fail-safe contact is achieved by a shaped part of solder material. Heating-up of the voltage-surge suppressor causes, by a welded-on or clamped-on guide plate, melting of the shaped part of solder material. The shaped part of solder material is subject to a minimum, precisely balanced spring force (pressure force) exerted by the slider. This force is close to the limit of self-locking of the slider. By an inclined orientation of a support face of the slider, generally a decoupling of the shaped part of solder material and of the spring force of the slider is obtained. The slider held in the operating condition by an edge at the housing will be released because of the melting of the shaped part of solder material and of the spring travel from the edge, thus becoming free. The slider moves backwards because of a compression spring mounted thereon, the spring being supported at an internal housing wall.

There is disposed at the slider, in the rear part of the plug, a red plastic part as a signalling element. With a movement of the slider, the red part it will be swung outwards from the plug and clearly shows the tripping condition.

Current protection is achieved by a fuse or a temperature-dependent resistor. The one-piece housing and a few individual parts only permit a low-cost, automated manufacture of the plug.

The slider is preferably formed as one piece, including a support portion having opposedly bent-off contact rings, a receiving portion for the spring, a contact face for the connection of the voltage-surge suppressor to ground over a ground plate (earth plate), a groove for holding the signalling element and a blade-spring portion, having a long spring arm. The blade-spring portion is bent off at its resilient end to form a web whereon the shaped part of the solder material is disposed and wherefrom the support face is bent off.

In the housing, there is preferably provided a stationary bearing portion as a fixed point of rotation for a circular outside surface of the signalling element. Additionally, a pin of the signalling element is supportedin the groove of the slider.

The printed-circuit board is preferably on either side with circuit tracks wherein there may be a through-plating in the section of the SMD solder pads and the printed-circuit board comprises the voltage-surge suppressor with the guide plate and fuse elements.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

The protection plug is particularly intended as a voltage-surge protection plug for telecommunication installations in conjunction with terminal blocks.

Figure 1:
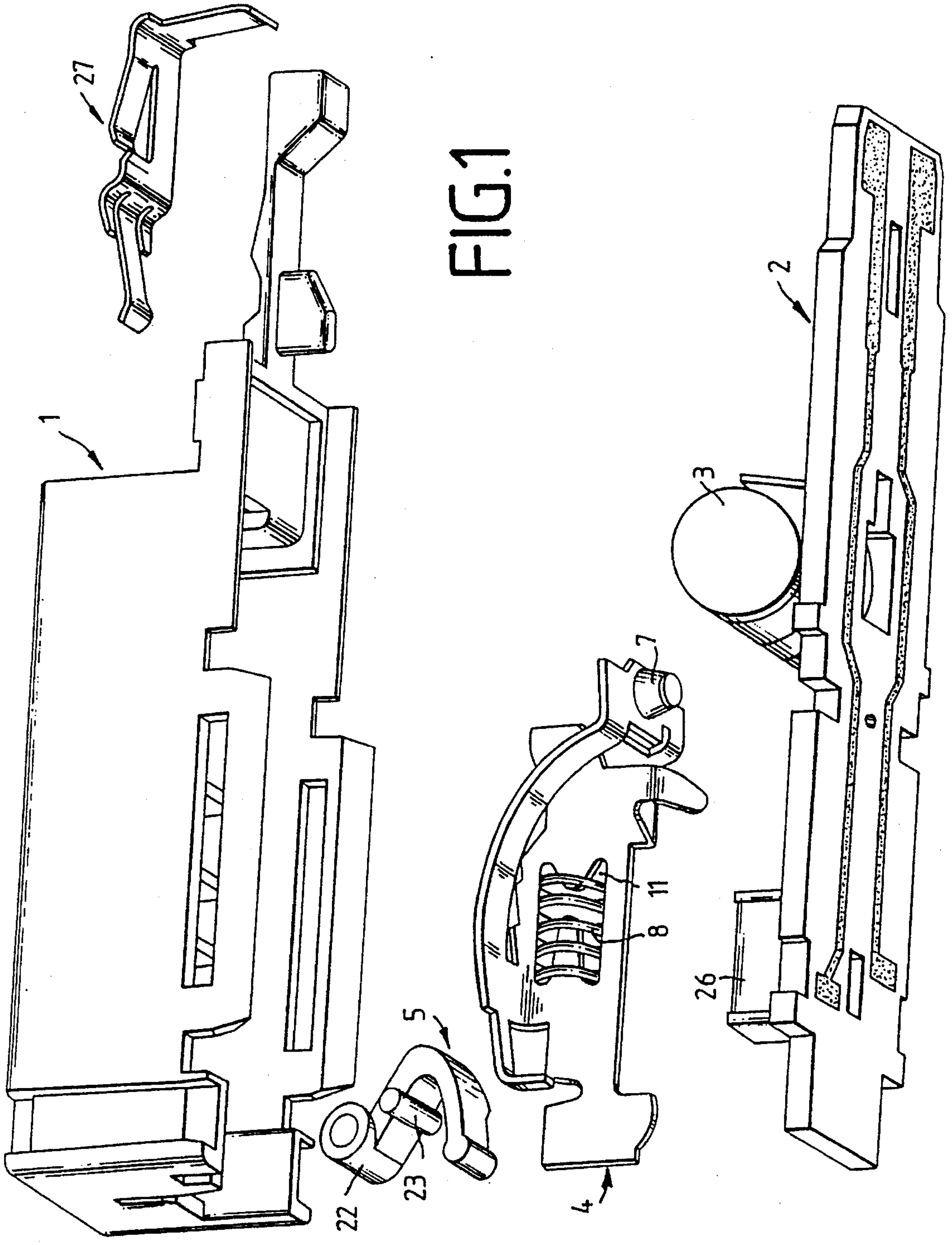
FIG. 1 is an exploded perspective view of the basic components of the protection plug.
Figure 3:
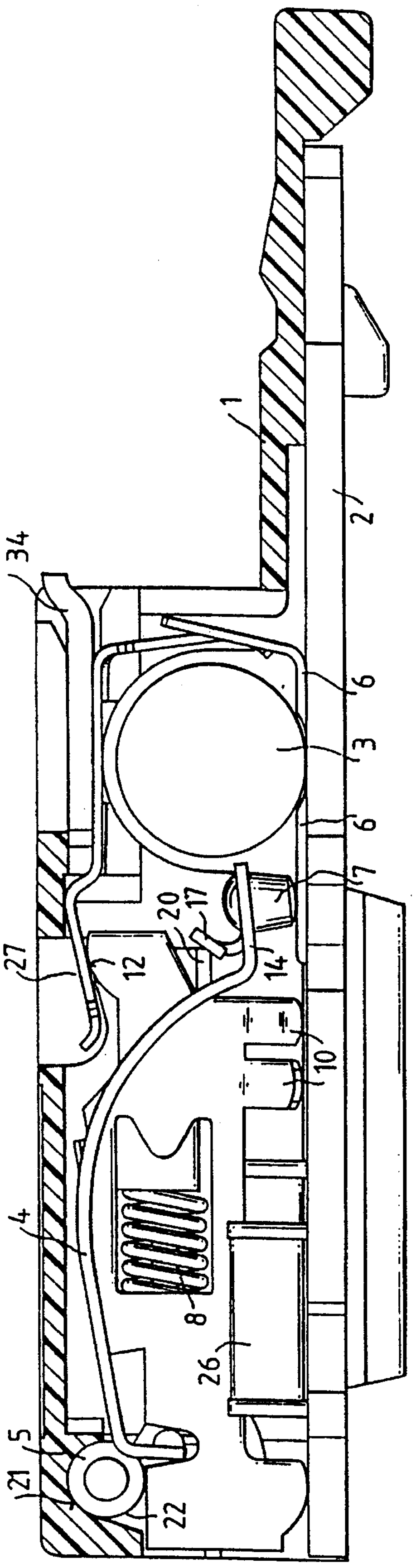
FIG. 3 is a side view of the opened-up plug.

FIG. 1 shows, in an exploded view, the components of the protection plug of the invention. According to the representation in FIG. 1, the protection plug comprises an outer housing 1, the bottom side of which being closed by a printed-circuit board 2 with a voltagesurge suppressor 3 and with fuse elements 26, a slider 4 with a compression spring 8 and a shaped part 7 of solder material, a signalling element 5 and an earth plate 27. The protection plug is connected by the earth plate 27 to the earth rail 34 of a not shown connector block and thereby to the earth of the protection system (FIG. 3).

Figure 2:
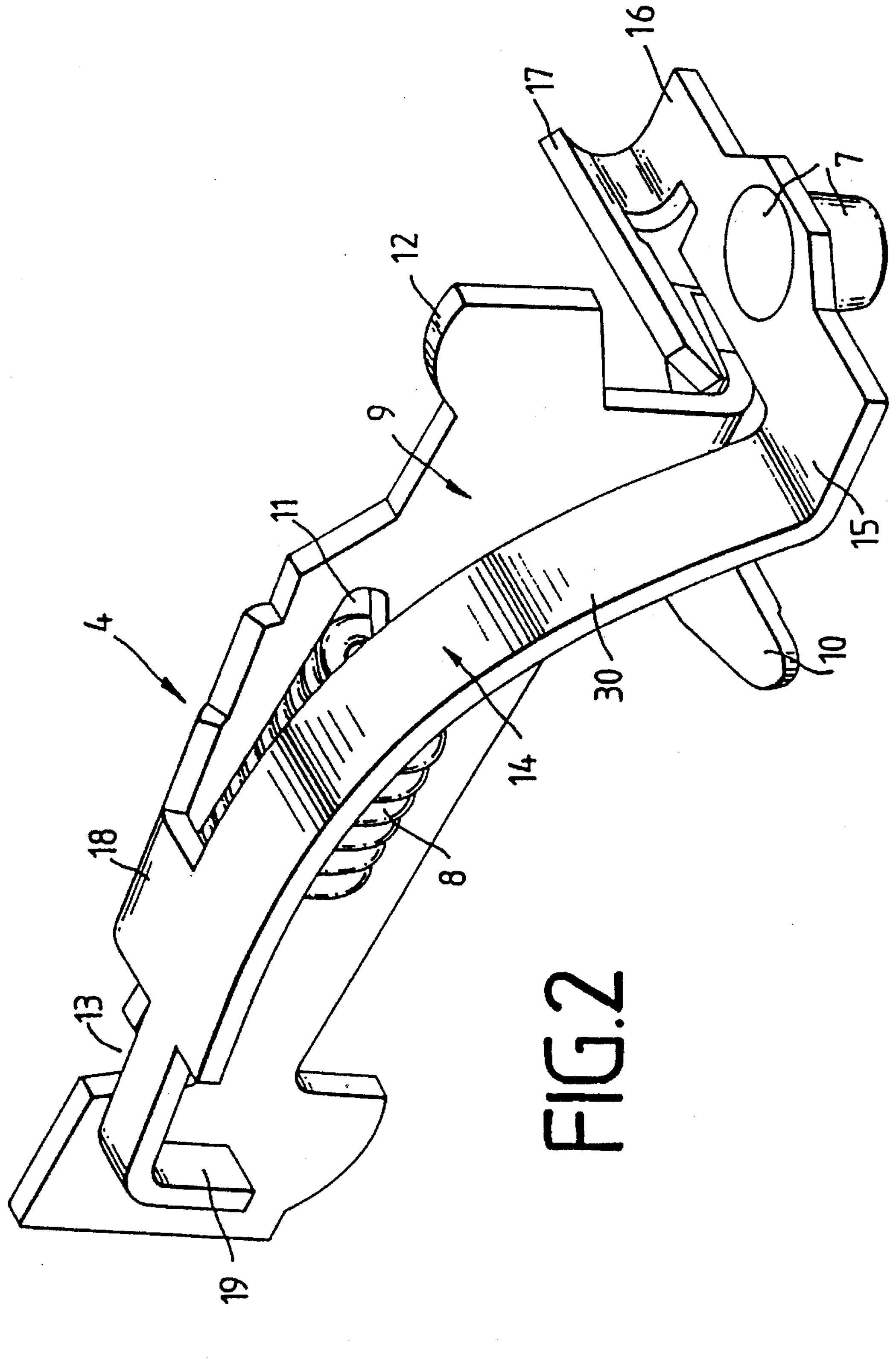
FIG. 2 is a perspective view of the slider.
Figure 4:
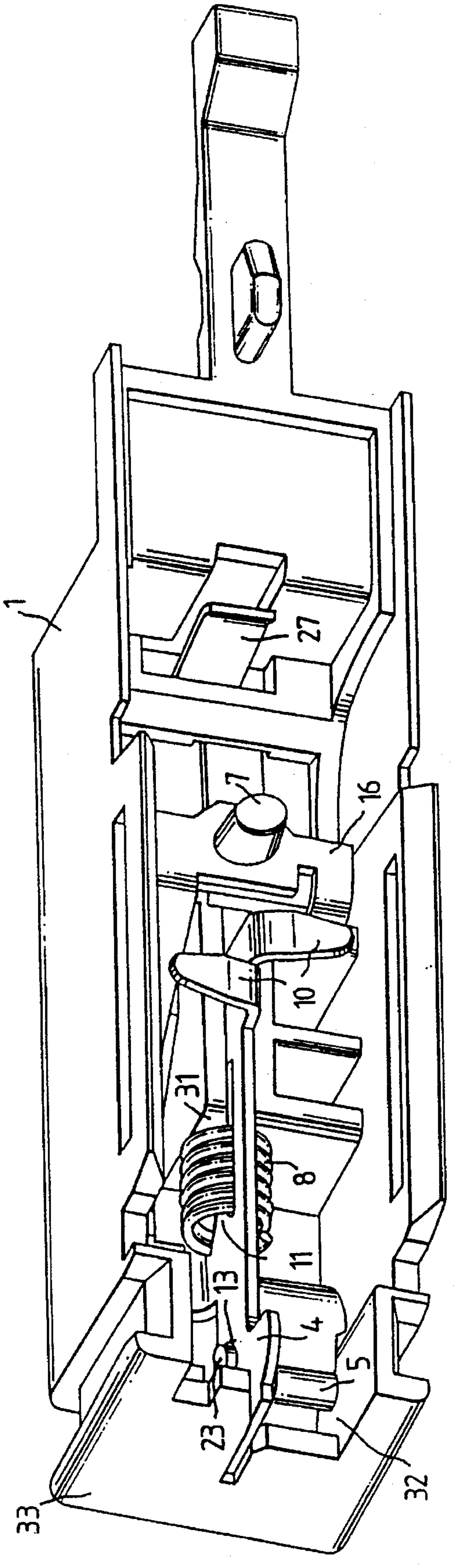
FIG. 4 is a top view of the opened-up bottom side of the plug (without printed-circuit board)
Figure 5:
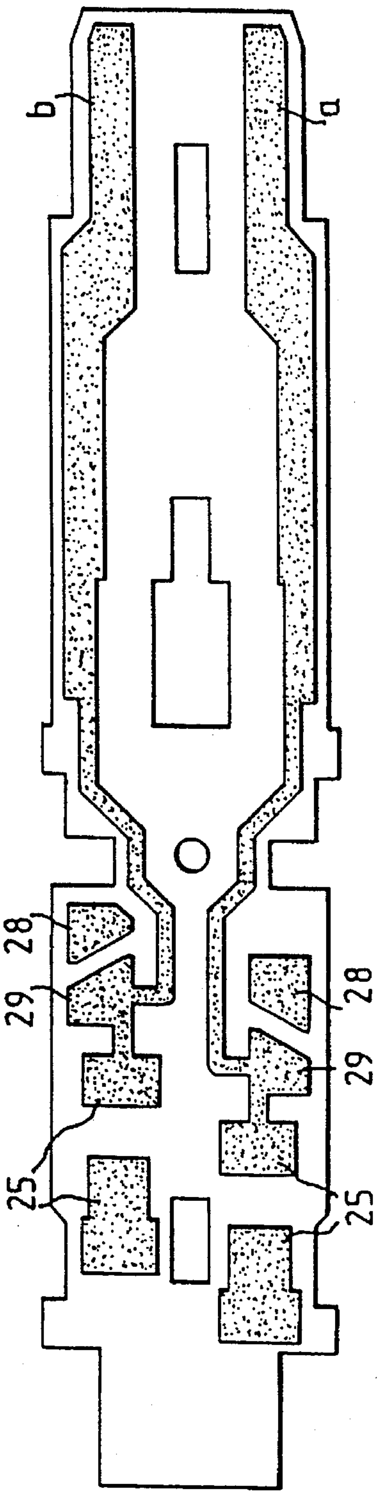
FIG. 5 is a top view of the printed-circuit board (top side)

FIG. 2 shows, in a perspective view, the slider 4 comprising a support portion 9 and a blade-spring portion 14 which are connected to each other as one piece by a connecting portion 18. The support portion 9 has two opposedly bent-off contact wings 10 (FIG. 4), which in the operating condition (no voltage surge) lie on rest faces 28 of the printed-circuit board 2 (FIG. 5), said rest faces having no electrical contact to the signal path. In case of a voltage surge for a longer period of time (e.g. in case of power crossing), the contact wings 10 are displaced by the movement of the slider 4 onto the contact faces 29 of the printed-circuit board 2 included in the signal path (FIG. 5). By this movement, the line paths a, b (FIGS. 1, 3, 5) are connected to ground (earth), and the voltage surge is carried away.

The support portion 9 comprises a receiving portion 11 (FIGS. 1, 4) for the helical spring 8 being supported at an inner housing wall 31 (FIG. 4) and against the spring force thereof the slider 4 being inserted into the housing 1 of the protection plug. By a contact face 12 of the support portion 9 an electrical connection between the slider 4 and the earth plate 27 and a guide plate 6 at the voltage-surge suppressor 3 (FIG. 3) is established, so that the voltage surge can be carried away over the earth rail 34 of a not shown terminal block, and the voltage-surge suppressor 3 is permanently connected to earth.

The groove 13 at the rear end of the support portion 9 serves for receiving the signalling element 5 (FIG. 1, 4).

The blade spring portion 14 is formed of a long spring arm 30. At the resilient end 15 of the spring arm 30 is a web 16 which is bent off. A bent-off stop portion 19 is provided behind the connecting portion 18 of the blade-spring portion 14. The web 16 carries the shaped part 7 of solder material and is provided as one piece with a bent-off support face 17. The support face 17 of the slider 4 is supported at a support edge means 20 of the housing 1 (FIG. 3) such that in the operating condition the slider 4 will exert nearly any force on the shaped part 7 of solder material, due to the self-locking forces, said shaped part 7 of solder material supporting the spring arm 30. Only in case of a voltage surge, when the support shaped part 7 of solder material melts, the support face 17 will slide from the edge 20 of the housing 1 and the slider 4 will move and cause the voltage to be carried away to earth and result in a signalling of the voltage surge case.

For the proper operation of the slider 4, the dimensions of the spring travel of the blade-spring portion 14 and thus the contact force thereof for precisely loading the shaped part 7 of solder material as well as the dimensions of the inclined orientation of the support face 17 in conjunction with the support edge 20 at the housing 1 are of enormous importance.

The groove 13 at the support portion 9 serves for swinging the signalling element 5 out of an opening 32 of the housing wall 33 (FIG. 4) when the slider 4 is moved backwards.

The slider 4 has to achieve, as the most important functional element of the protection plug, the short-circuit and the signalling thereof.

Based on FIGS. 3–6, the mode of operation of the protection plug will now be described.

The side view of the opened protection plug shows, according to FIG. 3, the functional elements of the protection plug in their constructional structure.

The housing 1 is downwardly closed by the printed-circuit board 2. The printed-circuit board 2 carries the voltage-surge suppressor 3 with the guide plate 6 attached thereat, which connects the voltagesurge suppressor 3 over the ground (earth) plate 27 in the upper part of the housing 1 and over the ground (earth) rail 34 of a not shown terminal block to ground (earth).

The slider 4 is in connection to ground (earth) by its contact face 12 (FIG. 2) over the ground (earth) plate 27 and to the guide plate 6 of the voltage-surge suppressor 3 over the shaped part 7 of solder material. When the voltage-surge suppressor 3 heats up, heat will be conducted over the welded-on guide plate 6 to the shaped part 7 of solder material. The shaped part 7 of solder material is subject, as described above, to a slight, precisely balanced spring force (pressure force) of the slider 4. The slider 4 used as a fail-safe mechanism and for an optical signalling of a voltage surge, is released by the spring travel of its position defined by the edge 20 at the housing 1 and by the support face 17 at the blade-spring portion 14 of the slider 4, when the shaped part 7 of solder material melts by heat influence. The slider 4 moves backwards, i.e. away from the position of the voltage-surge suppressor, because of the compression spring 8 attached thereon (as described above). The compression spring being supported at the inner housing wall 31 (FIG. 4). The two contact wings 10 provided at the slider 4 (FIG. 4) are displaced by the slider movement from the rest faces 28 onto two contact faces 29 (FIG. 5). The contact faces 29 are each contact points of the telephone wires a, b. By the contact wings 10 provided at the slider 4, the wires a, b are connected to ground (earth).

The voltage-surge suppressor 3 will remain connected to ground (earth), in the short-circuited condition, after tripping of the fail-safe mechanism. Contact to the ground (earth) rail 34 (FIG. 3) of the terminal block (not shown) is achieved by the welded-on guide plate 6 and the earth plate 27. In the not tripped condition, earth is further connected over the shaped part 7 of solder material and the guide plate 6 to the voltagesurge suppressor 3.

In the rear part of the plug, the red signalling element 5 (FIG. 1) is disposed or supported, respectively, at the slider 4 so that it will be swung or rotated, respectively, out of the plug upon movement of the slider 4. For this purpose, a stationary bearing portion 21 (semicircular inner face as a bearing) is provided in the housing 1 as a fixed point of rotation for the circular outside surface 22 of the signalling element 5, a pin 23 being supported in the groove 13 of the slider 4 (FIGS. 1, 4).

Figure 6:
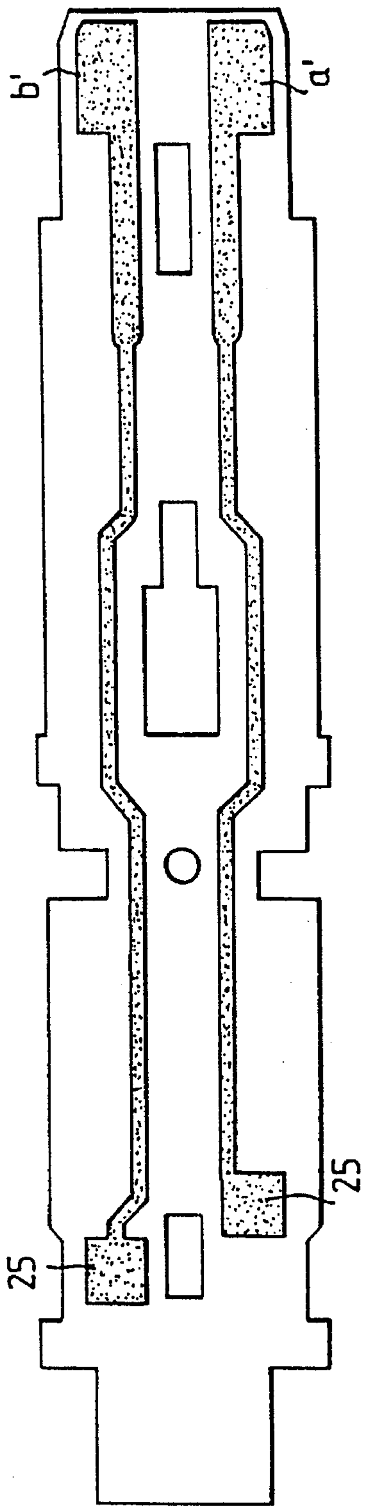
FIG. 6 is a top view of the printed-circuit board (bottom side).

Current protection is achieved by the SMD fuse 26 being contacted by the solder pads 25 (FIGS. 3, 5, 6). The solder pads 25 are through-plated towards the bottom side of the printed-circuit board 2 (FIG. 6).

The fuse caps (not shown) are accessible from outside to measuring tips and serve as measurement tapping positions for the individual wires.

While a specific embodiment of the invention has been shown and described in detail to illustrate the application of the principles of the invention, it will be understood that the invention may be embodied otherwise without departing from such principles.

What is claimed is:

1. A protection plug for over-voltage protection for telecommunication installations, comprising:

a housing with a printed circuit board, said housing including an inner housing wall with a support edge;

a voltage-surge suppressor;

a spring;

a ground plate;

a signalling element;

a slider, said slider being formed as one piece and including a support face, a support portion having opposedly bent-off contact rings, a receiving portion for receiving said spring, a contact face for the connection of said voltage-surge suppressor to ground over said ground plate, a groove for holding said signalling element, a blade-spring portion, having a long spring arm, said blade spring portion being bent off at a resilient end to form a web whereon a shaped part of solder material is disposed and wherefrom a support face is bent off, said spring being disposed in said housing to preload said support face of said slider in said housing against said support edge of said inner housing wall, said shaped part of solder material being loaded to a minimum extent by a spring force of said slider.

2. A protection plug according to claim 1, wherein said housing includes a stationary bearing portion as a fixed point of rotation for a circular outside surface of said signalling element, a pin of said signalling element being supported in said groove of said slider.

3. A protection plug according to claim 1, wherein said printed-circuit board includes at least one side with circuit tracks and including a through-plated portion in a section of a solder pad, said printed-circuit board comprising said voltage-surge suppressor in cooperation with said guide plate and fuse elements.

4. An electrical protection plug comprising:

a housing:

a slider positioned in said housing and movable between a first and second position;

a spring means for biasing said slider toward said second position with a biasing force;

a voltage surge suppressor positioned in said housing;

a shaped part of solder in thermal contact with said voltage surge suppressor, said shaped part of solder being positioned to block movement of said slider from said first position to said second position;

a support edge positioned in said housing to block movement of said slider from said first position to said second position in cooperation with said shaped part of solder, said support edge supporting a majority of said biasing force from said spring means.

5. An electrical protection plug in accordance with claim 4, wherein:

said support edge supports a maximum amount of said biasing force and said shaped part of solder supports a minimum amount of said biasing force.

* * * * *